United States Patent
Long et al.

(10) Patent No.: US 6,382,248 B1
(45) Date of Patent: May 7, 2002

(54) SELF-DIAGNOSING PRESSURE REGULATOR APPARATUS

(75) Inventors: Charles Francis Long, Pittsboro, IN (US); Michael Leo Duhaime, Novi, MI (US); Martin Robert Dadel, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/790,952

(22) Filed: Feb. 23, 2001

(51) Int. Cl.$^7$ ............................................. F15B 13/043

(52) U.S. Cl. .............. 137/557; 137/625.64; 137/625.66

(58) Field of Search ....................... 137/625.64, 625.66, 137/557

(56) References Cited

U.S. PATENT DOCUMENTS

| | | | | |
|---|---|---|---|---|
| 5,564,543 A | * | 10/1996 | Wilson | 91/453 X |
| 5,911,244 A | | 6/1999 | Long et al. | 137/625.64 |
| 5,934,322 A | * | 8/1999 | Oehme | 137/625.64 |

* cited by examiner

*Primary Examiner*—Gerald A. Michalsky
(74) *Attorney, Agent, or Firm*—Leslie C. Hodges

(57) ABSTRACT

An improved and self-diagnosing shift pressure regulator apparatus for an automatic shift transmission provides a diagnostic output that reliably and timely detects initiation and cessation of fluid supply to a friction element. The regulator apparatus includes a pressure regulator valve responsive to an electronically developed pilot pressure, and a diagnostic switch. The pilot pressure positions the pressure regulator valve in one of three states—ON, TRIM, and OFF—and the diagnostic switch is continuously activated by a control pressure whenever the pressure regulator valve is in the TRIM or ON states.

10 Claims, 4 Drawing Sheets

SELF-DIAGNOSING PRESSURE REGULATOR APPARATUS

TECHNICAL FIELD

This invention relates to electronic shift control of an automatic transmission, and more particularly to a shift pressure regulator valve and diagnostic switch therefor.

BACKGROUND OF THE INVENTION

In general, a motor vehicle automatic transmission includes a number of elements and selectively engageable friction elements (referred to herein as clutches) that are controlled to establish one of several speed ratios between the transmission input and output shafts. Shifting from a currently established speed ratio to new speed ratio involves, in most cases, disengaging a clutch (off-going clutch) associated with the current speed ratio and engaging a clutch (on-coming clutch) associated with the new speed ratio.

The torque capacity of a clutch (on-coming or off-going) involved in a shift may be conveniently controlled by the combination of an electrically activated solenoid valve and a pressure regulator valve, as disclosed, for example, in the U.S. Pat. No. 5,911,244 to Long et al., issued on Jun. 15, 1999, assigned to the assignee of the present invention, and incorporated herein by reference. In a typical system, the solenoid valve is activated by pulse-width-modulation (PWM) at a controlled duty cycle to develop a pilot pressure for the pressure regulator valve, which in turn, supplies fluid pressure to the clutch in proportion to the solenoid duty cycle.

It is important to reliably and inexpensively diagnose clutch engagement and disengagement in the above-described clutch controls, both to verify shift progression, and to detect an inadvertent engagement or disengagement. This can be accomplished either indirectly by analyzing the transmission input and output speeds, or directly by installing pressure switches at each of the clutches. However, the diagnostic output with either of these techniques is only developed once the respective clutch has actually started to engage or disengage, which is not especially desirable if the engagement or disengagement is inadvertent. Theoretically, of course, one could alternatively measure the pilot pressure or the position of the pressure regulator valve, but such approaches are generally expensive to implement, and trouble-prone due to the characteristic dithering of a pressure regulator valve. Accordingly, what is needed is an inexpensive clutch pressure control arrangement that provides a reliable diagnostic output early in the clutch pressure control process.

SUMMARY OF THE INVENTION

The present invention is directed to an improved and self-diagnosing shift pressure regulator apparatus for an automatic shift transmission, wherein a diagnostic output provides reliable and timely diagnostic information regarding initiation and cessation of fluid supply to a friction element. According to the invention, the regulator apparatus includes a pressure regulator valve responsive to an electronically developed pilot pressure, and a diagnostic switch. The pilot pressure positions the pressure regulator valve in one of three states—ON, TRIM, and OFF—and the diagnostic switch is continuously activated by a control pressure whenever the pressure regulator valve is in the TRIM or ON states.

The pressure regulator valve has a spool element axially positionable within a valve bore and having spaced lands defining first fluid chamber continuously coupled to the friction element, and a second fluid chamber continuously coupled to a pressure-responsive diagnostic switch. The spool element is positioned in the valve bore in response to a variable trim pressure, which is opposed by a return spring and a feedback pressure from the friction element. In the OFF state, fluid in said first and second fluid chambers is exhausted through said exhaust passages uncovered by the spaced lands, and the diagnostic switch detects a deactivated state of the valve. In the TRIM state, the valve regulates the fluid pressure in first chamber in relation to the trim pressure, the second chamber is continuously coupled to a fluid pressure passage, and the diagnostic switch detects an activated state of the valve. In the ON state, the first chamber is continuously coupled to a fluid pressure passage to fully engage the friction element, the second chamber remains continuously coupled to the fluid pressure passage, and diagnostic switch consequently continues to detect an activated state of the valve.

DESCRIPTION OF THE PREFERRED EMBODIMENT

Figure 1:
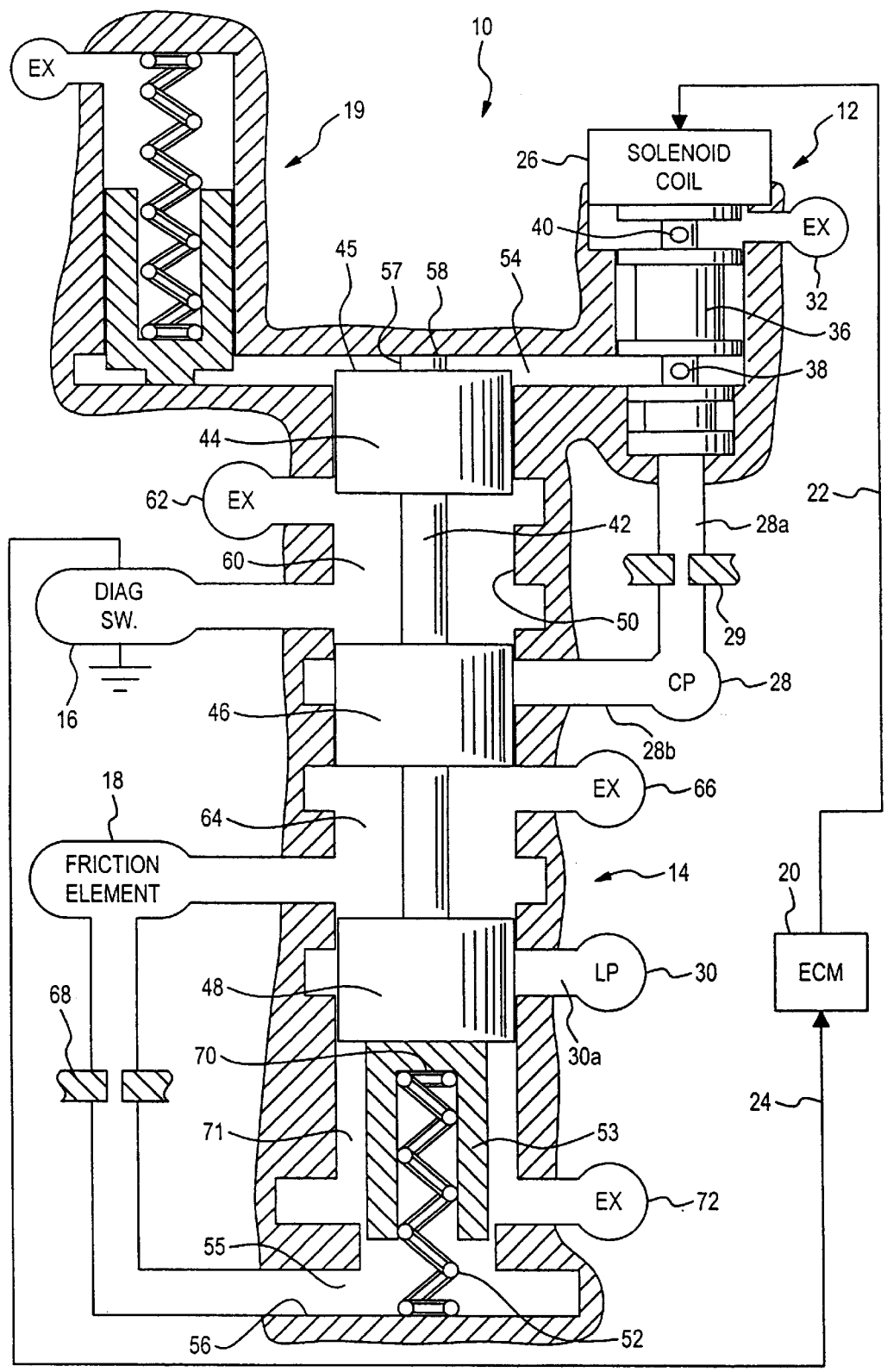
FIG. 1 is a diagram of the shift pressure control apparatus of this invention with the pressure regulator valve depicted in an OFF state.
Figure 2:
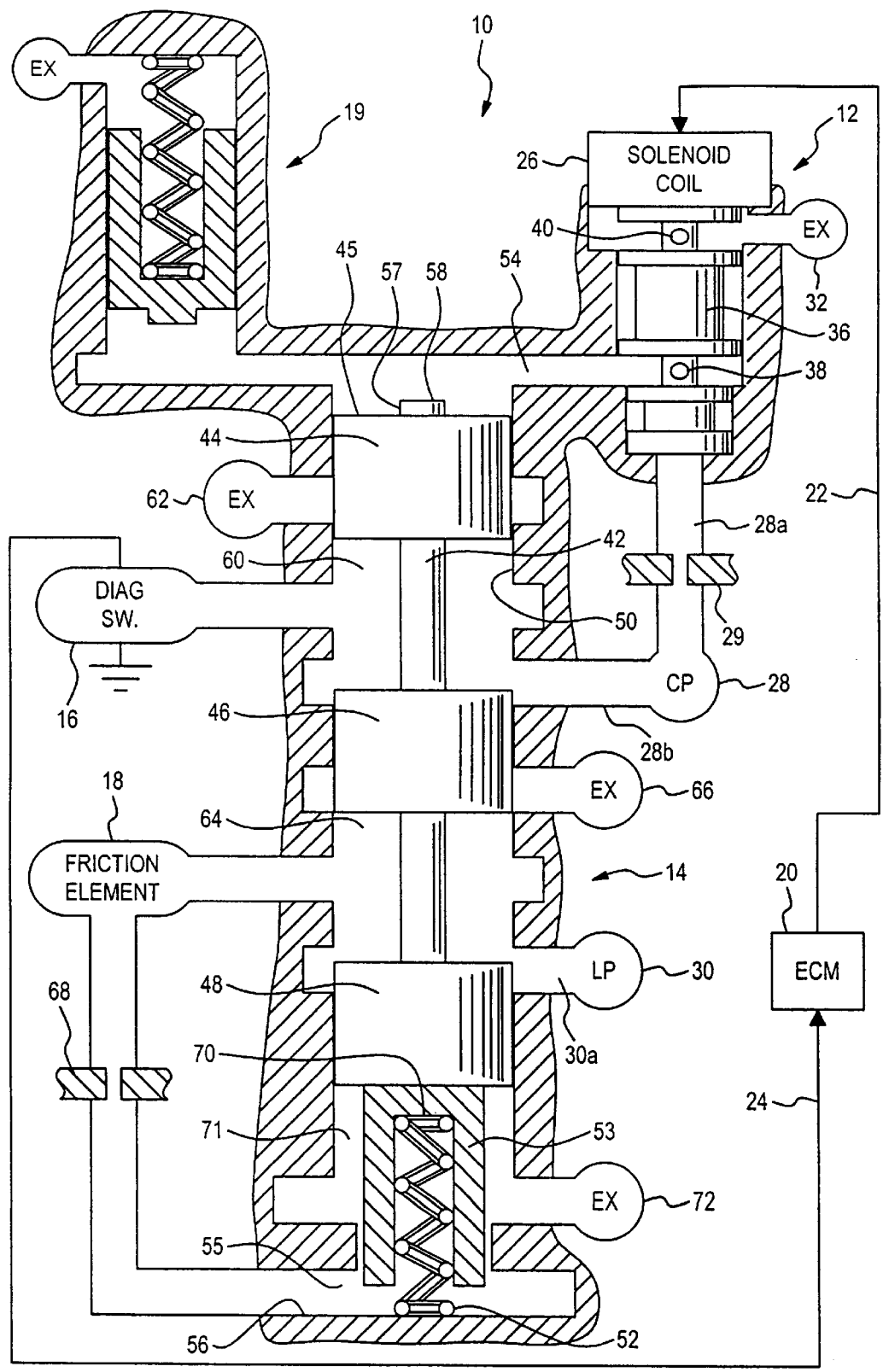
FIG. 2 is a diagram of the shift pressure control apparatus of this invention with the pressure regulator valve depicted in a TRIM state.
Figure 3:
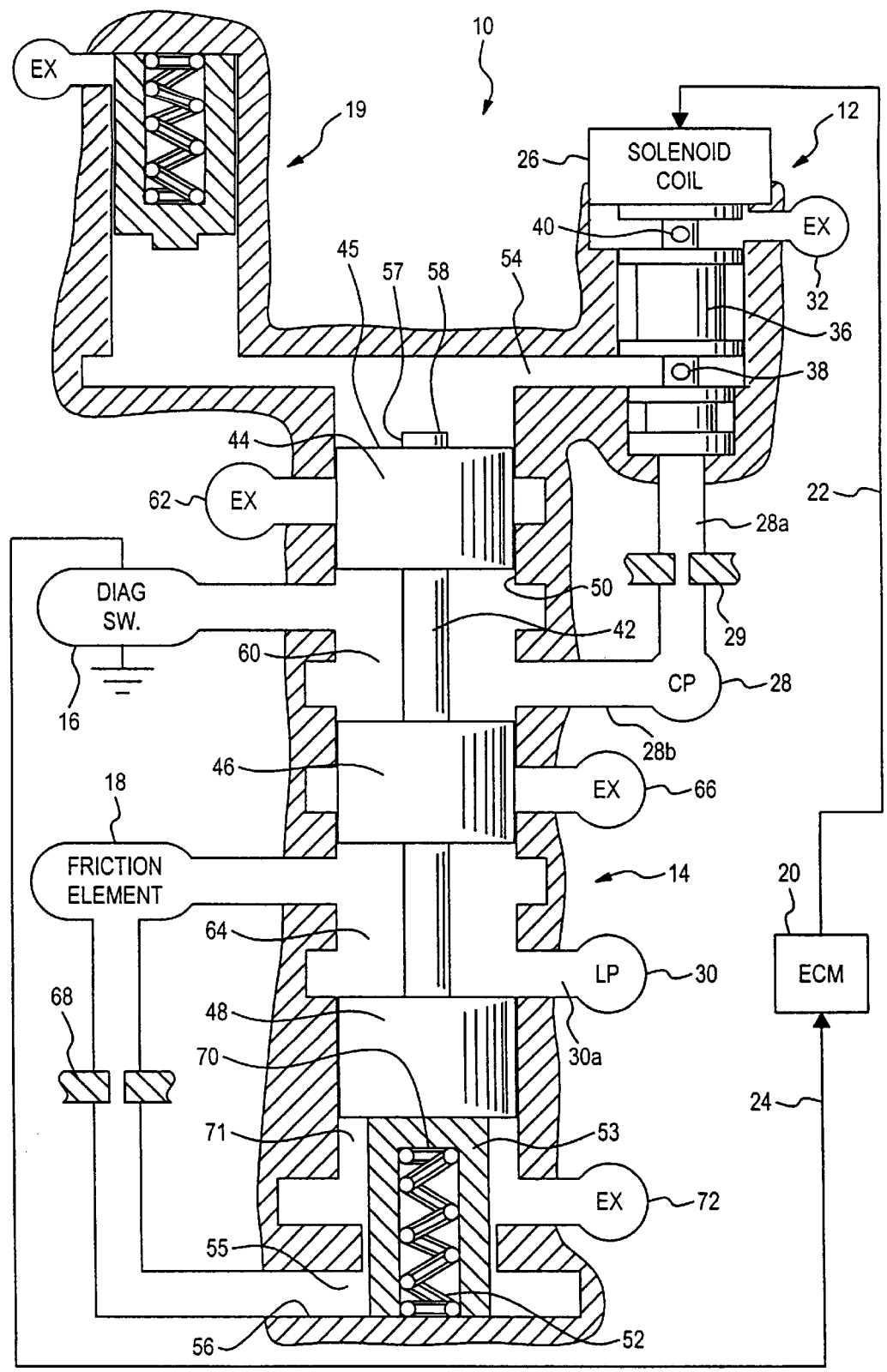
FIG. 3 is a diagram of the shift pressure control apparatus of this invention with the pressure regulator valve depicted in an ON state.

Referring to the drawings, and particularly to FIGS. 1–3, the reference numeral 10 generally designates a self-diagnosing shift pressure control apparatus according to this invention in the context of a motor vehicle automatic shift transmission. The shift pressure control apparatus 10 includes a solenoid valve 12, a pressure regulator valve 14 and a diagnostic switch 16. The solenoid valve 12 is coupled to the pressure regulator valve 14, which in turn, is coupled to the diagnostic switch 16 and a transmission friction element 18 such as a clutch or brake. FIGS. 1–3 also depict an accumulator 19 for hydraulically filtering step changes in the output pressure of solenoid valve 12, but it should be understood that the inclusion of accumulator 19 is considered optional. Finally, an electronic control module (ECM) 20 develops a control signal on line 22 for activating the solenoid valve 12, and receives a diagnostic input from switch 16 via line 24. The solenoid valve 12 includes a coil 26, and in the illustrated embodiment, the control signal on line 22 is a pulse-width-modulation (PWM) signal having a duty cycle that is established by ECM 20 to produce a desired fluid pressure in friction element 18. Also shown in FIGS. 1–3 are the control pressure (CP) source 28 and the line pressure (LP) source 30, which are developed by conventional elements including an engine driven pump and suitable pressure regulator valves (not shown); in general, the line pressure LP may have a value of about approximately 150–300 PSI, and the control pressure CP is regulated to a lower value such as 100 PSI.

The solenoid valve 12 is coupled to control pressure passage 28a, exhaust passage 32 and pilot pressure passage 54, and includes a fixed spool 15 mechanism 36 having a pair of ports 38 and 40, and an armature (not shown) movably disposed within the spool mechanism 36. The spool port 38 is coupled to control pressure passage 28a, the spool port 40 is coupled to the exhaust passage 32, and the armature selectively couples the spool ports 38 and 40 to variably exhaust the fluid pressure in pilot pressure passage 54. An internal spring mechanism (not shown) biases the armature to a position which couples spool ports 38 and 40, and activation of the solenoid coil 26 produces an electromagnetic force that overcomes the spring bias, and moves the armature to un-couple the spool ports 38 and 40. Thus, PWM activation of the coil 26 by ECM 20 results in a modulated pressure in passage 54, the average value of which is related to control pressure CP by the PWM duty cycle.

The pressure regulator valve 14 has a spool element 42 including three lands 44, 46, 48, the spool element 42 being axially movable within the valve bore 50 under the influence of a return spring 52 captured in a cylindrical extension 53 of land 48, a pilot pressure applied to a pressure control area 45 of land 44, and a feedback pressure applied to a pressure control area 70 of cylindrical extension 53. In particular, the spool element 42 is actuated to one of three states under the control of solenoid valve 12, the various states being individually depicted by FIGS. 1, 2 and 3.

FIG. 1 depicts a rest or OFF state of the spool element 42 that occurs when the solenoid coil 26 is deactivated, exhausting the fluid pressure in pilot pressure passage 54 via exhaust passage 32. In such state, the return spring 52 biases spool element 42 upward, bringing a stem portion 57 of land 44 into engagement with a seat 58 formed in passage 54. The diagnostic switch 16, which is coupled to the fluid chamber 60 between lands 44 and 46, detects a very low pressure since the fluid chamber 60 is exhausted via exhaust passage 62. Similarly, the friction element 18, which is coupled to the fluid chamber 64 between lands 46 and 48, is exhausted via exhaust passage 66.

FIG. 2 depicts a TRIM state of the spool element 42 that occurs when the solenoid coil 26 is activated in a range of duty cycles where the pilot pressure in passage 54 acting on a control area to partially compress the return spring 52. Such pressure also partially strokes the accumulator 19, as shown. In such state, the spool element 42 moves downward and initially couples the fluid chamber 64 to line pressure passage 30a. This builds fluid pressure in friction element 18, creating a feedback pressure in passage 55, which is coupled to friction clutch 18 via restriction 68. The feedback pressure acts on the pressure control area 70, and any fluid leaking into the area 71 surrounding cylindrical extension 53 is exhausted via exhaust passage 72. The force created by the feedback pressure assists the force created by return spring 52, and the spool element 42 dithers to alternately couple the fluid chamber 64 to exhaust passage 66 and line pressure passage 30a, thereby regulating the fluid pressure delivered to friction element 18 to a level that is proportional to the pilot pressure in passage 54. However, when spool element 42 is in the TRIM state, the lands 44 and 46 continuously cover exhaust passage 62 and uncover control pressure passage 28b, respectively, so that the diagnostic switch 16 continuously detects the control pressure CP. Thus, the dithering of spool element 42 in the TRIM state does not affect the pressure detected by diagnostic switch 16; this significantly enhances the durability of diagnostic switch 16, and ensures that the diagnostic output on line 24 consistently and reliably detects the initiation of fluid flow to the friction element 18. Additionally, the fact that diagnostic switch 16 is subjected to a pressure no higher than control pressure CP relaxes its manufacturing specifications, and reduces its cost.

FIG. 3 depicts an ON state of the spool element 42 that occurs when solenoid coil 26 is activated at a very high duty cycle that produces sufficient fluid pressure in pilot pressure passage 54 to overcome the feedback pressure and fully compress the return spring 52, bringing the cylindrical extension 53 into contact with the bottom surface 56 of valve bore 50. Such pressure also fully strokes the accumulator 19, as shown. In such state, the land 44 continues to block exhaust passage 62 so that diagnostic switch 16 continues to detect the control pressure CP. Additionally, the land 46 fully blocks exhaust passage 66, and the land 48 fully uncovers the line pressure passage 30a, thereby supplying friction element 18 with full line pressure LP.

When the friction element is to be disengaged, the above-described process is reversed by reducing the duty cycle of solenoid coil 26, first to an intermediate range of duty cycles to establish TRIM control, and then deactivating solenoid coil 26 to return to the rest or OFF state. In this case, the diagnostic switch 16 remains activated until the spool element 42 transitions from the TRIM state to the rest or OFF state. Thus, the diagnostic switch 16 is activated when fluid supply to friction element 18 is initiated during its engagement, and is deactivated at the termination of fluid pressure control of friction element 18 during its disengagement.

Figure 4:
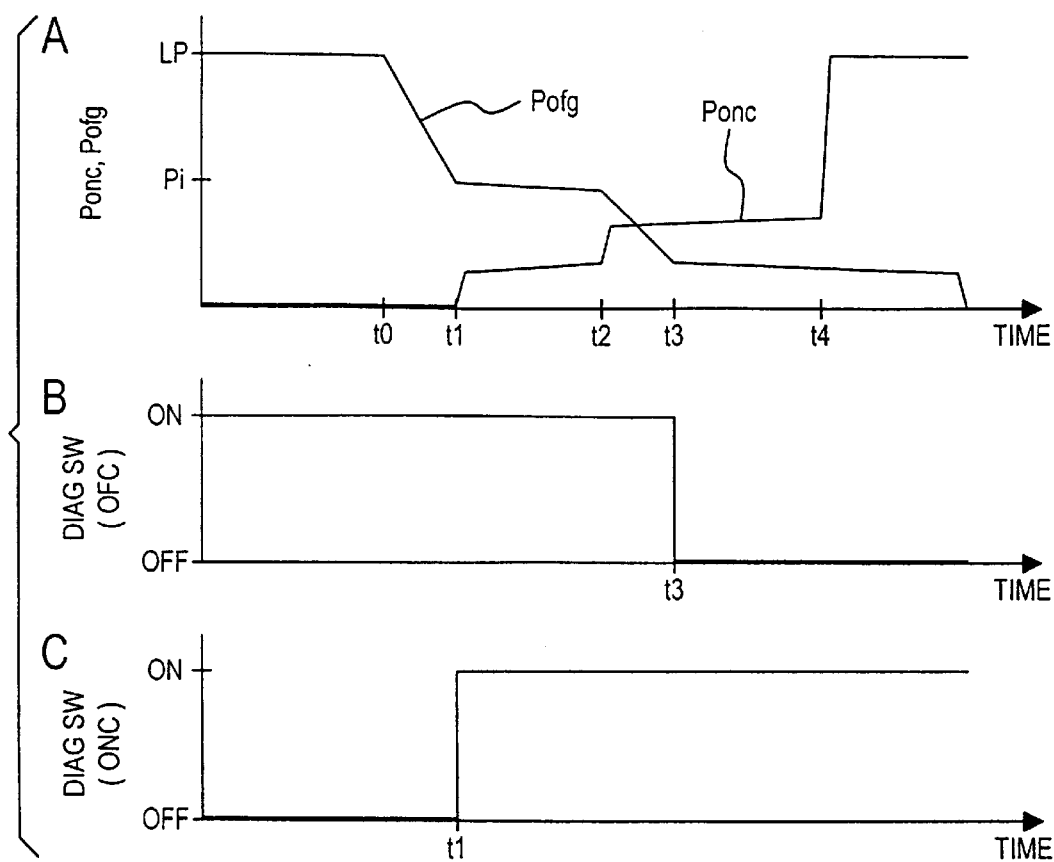
FIG. 4, Graphs A, B and C, depict on-coming and off-going clutch pressures, on-coming diagnostic switch state, and off-going diagnostic switch state, respectively, during the course of an upshift.

The timing described in the preceding paragraph is graphically depicted in FIG. 4, where Graph A depicts the fluid pressures Ponc, Pofg supplied to on-coming and off-going clutches in the course of an upshift, Graph B depicts the state of the diagnostic switch for the off-going clutch, and Graph C depicts the state of the diagnostic switch for the on-coming clutch. Initially, of course, the diagnostic switch for the off-going clutch is activated (ON), and the diagnostic switch for the on-coming clutch is deactivated (OFF). The shift is initiated at time t0 by biasing the pressure regulator valve for the off-going clutch to the TRIM state, reducing the off-going clutch pressure to an initial value Pi at time t1. At such point, the pressure regulator valve for the oncoming clutch is also biased to the TRIM state to begin supplying fluid to the on-coming clutch, at which point the on-coming diagnostic switch is activated. When the on-coming clutch is filled at time t2, its pressure is increased and the reduction of the off-going pressure is increased. When the inertia phase of the shift commences at time t3, the pressure regulator valve for the off-going clutch is biased to the OFF state, deactivating the off-going diagnostic switch, as seen in Graph B. Finally, at time t4, the pressure regulator valve for the on-coming clutch is biased to its ON state, increasing the on-coming pressure to line pressure LP and completing the upshift. Thus, initiation of fluid supply to the on-coming clutch is verified by activation of the on-coming diagnostic switch, and release of the off-going clutch is verified by de-activation of the off-going diagnostic switch.

Figure 5:
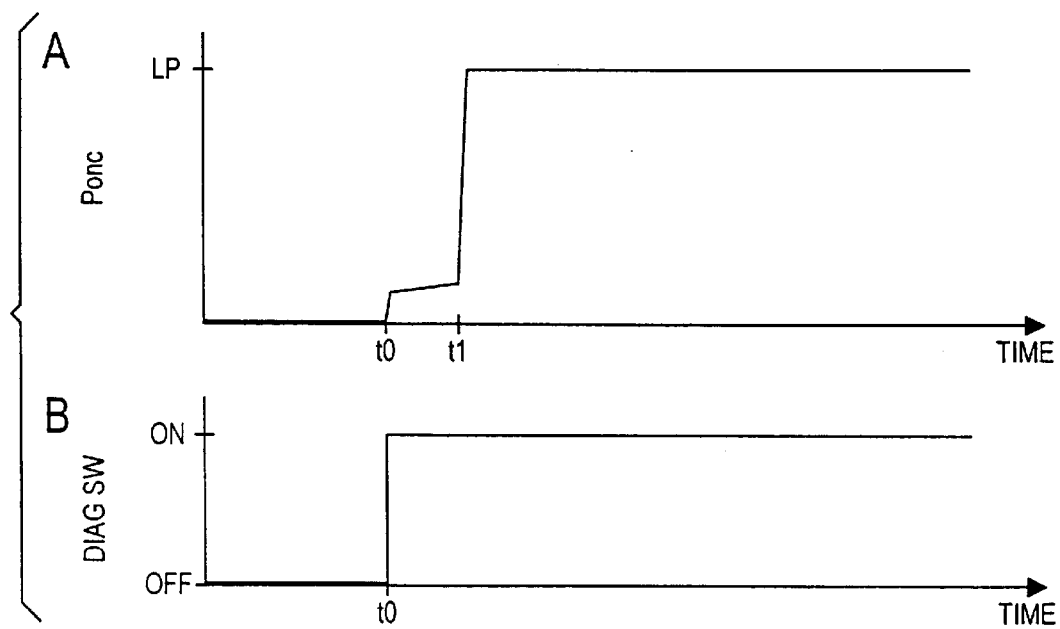
FIG. 5, Graphs A and B, depict clutch pressure, and diagnostic switch state, respectively, for an unintended clutch engagement.

In addition to verifying an intended engagement or disengagement of a friction element 18 as explained above, the state of the diagnostic switch 16 can also be used to provide early detection an unintended engagement of the friction element 18. This is graphically illustrated in FIG. 5, where Graph A depicts the friction element pressure (Ponc) that could occur due to an unintended activation of the solenoid coil 26, and Graph B depicts the state of the diagnostic switch 16. As with the upshift depicted in FIG. 4, the diagnostic switch 16 is activated to the ON state at time to when the pressure regulator valve 14 is initially biased to the TRIM state to begin supplying fluid to the friction element 18. By contrast, other diagnostic measures would not detect the unintended engagement until the friction element had developed significant torque capacity, at which point it might be too late to take corrective action designed to prevent an undesired vehicle deceleration or damage to the transmission. Even more significantly, the diagnostic state change detects any kind of unintended activation of pressure regulator valve 14, whether partial or full, and whether due to sticking of the spool element 42 or unintended operation of solenoid valve 12.

In summary, the pressure regulator apparatus of the present invention provides reliable and timely diagnostic information regarding initiation and cessation of fluid supply to a friction element 18. Thus, the output of diagnostic switch 16 is not affected by response time delays, due hydraulic lag for example. Furthermore, the diagnostic switch 16 may be relatively inexpensive since it need not precisely detect a certain pressure level; the diagnostic switch 18 is subjected either to exhaust back-pressure (very low) or control pressure CP, and it only needs to be capable of distinguishing between the two. While the pressure regulator apparatus of this invention has been described in reference to the illustrated embodiment, it will be understood that various modifications in addition to those mentioned above will occur to those skilled in the art. For example, the accumulator 19 could be omitted as mentioned above, the pilot or trim pressure applied to passage 54 could be developed by a device other than the solenoid valve 12, and so on. Thus, it will be understood that systems incorporating these and other modifications may fall within the scope of this invention, which is defined by the appended claims.

What is claimed is:

1. A self-diagnosing pressure regulator apparatus for supplying a regulated fluid pressure to a hydraulic element in relation to a trim pressure, comprising:

a pressure regulating valve spool axially positionable within a valve bore, the valve spool having first and second opposed pressure control areas and spaced lands defining first and second fluid chambers between said lands, said hydraulic element being continuously coupled to said first fluid chamber;

a pressure-responsive diagnostic switch being continuously coupled to said second fluid chamber;

first and second fluid pressure passages and first and second exhaust passages selectively coupled to said first and second fluid chambers, respectively, depending on the position of said valve spool within said valve bore, said first and second fluid pressure passages containing first and second fluid pressures, and said exhaust passages containing an exhaust pressure; and a trim passage for directing said trim pressure to the first pressure control area, and a spring and hydraulic element feedback pressure acting on the second pressure control area, whereby said valve spool is positioned within said valve bore in response to said trim pressure, said spring and said feedback pressure to establish one of: (1) an OFF state in which fluid in said first and second fluid chambers is exhausted through first and second exhaust passages and said diagnostic switch detects a deactivated state of said valve spool in response to said exhaust pressure, (2) a TRIM state in which fluid in said first chamber is regulated in relation to said trim pressure, said second chamber is continuously coupled to said second fluid pressure passage, and said diagnostic switch detects an activated state of said valve spool in response to said second fluid pressure and (3) an ON state in which said first chamber is continuously coupled to said first fluid pressure passage, said second chamber is continuously coupled to said second fluid pressure passage, and said diagnostic switch detects an activated state of said valve spool in response to said second fluid pressure.

2. The pressure regulator apparatus of claim 1, wherein:

said valve spool has first, second and third spaced lands, said first fluid chamber is defined by an area between said first and second lands, and said second fluid chamber is defined by an area between said second and third lands.

3. The pressure regulator apparatus of claim 2, wherein when said valve spool is positioned to establish said OFF state:

said second land covers said second fluid pressure passage to isolate said second fluid pressure from said second fluid chamber; and said third land uncovers said second exhaust passage to continuously couple said exhaust pressure to said second fluid chamber.

4. The pressure regulator apparatus of claim 2, wherein when said valve spool is positioned to establish said TRIM and ON states:

said second land uncovers said second fluid pressure passage to continuously couple said second fluid pressure to said second fluid chamber; and said third land covers said second exhaust passage to isolate said exhaust pressure from said second fluid chamber.

5. The pressure regulator apparatus of claim 1, wherein:

said first fluid pressure is a transmission line pressure; and said second fluid pressure is a control pressure which is lower than said transmission line pressure.

6. A self-diagnosing pressure regulator apparatus for supplying a regulated fluid pressure to a hydraulic element in relation to a trim pressure, comprising:

a pressure-responsive diagnostic switch;

a pressure regulator valve having a valve bore and a spool with axially spaced lands that is axially positionable within said valve bore, the spaced lands defining a first fluid chamber continuously coupled to said hydraulic element and a second fluid chamber continuously coupled to said diagnostic switch; and said spool being positioned in said valve bore in response to said trim pressure to establish one of: (1) an OFF state in which said first and second fluid chambers are exhausted and said diagnostic switch detects a deactivated state of said spool in response to an exhaust pressure in said second fluid chamber; (2) a TRIM state in which fluid is supplied to said hydraulic element through said first fluid chamber and partially pressurized based on said trim pressure, said second chamber is continuously coupled to a control pressure, and said switch detects an activated state of said spool in response to said control pressure; and (3) an ON state in which said first chamber and said hydraulic element are fully pressurized, said second chamber is continuously coupled to said control pressure, and said diagnostic switch detects an activated state of said spool in response to said control pressure.

7. The pressure regulator apparatus of claim 6, wherein:

said spool has first, second and third spaced lands, said first fluid chamber is defined by an area between said first and second lands, said second fluid chamber is defined by an area between said second and third lands, and said trim pressure acts on a pressure control area of said third land.

8. The pressure regulator apparatus of claim 7, wherein when said spool is positioned to establish said OFF state:

said second land covers a control pressure passage containing said control pressure to isolate said control pressure from said second fluid chamber; and said third land uncovers an exhaust passage containing an exhaust pressure to exhaust said second fluid chamber.

9. The pressure regulator apparatus of claim 7, wherein when said spool is positioned to establish said TRIM and ON states:

said second land uncovers a control pressure passage containing said control pressure to continuously couple said second fluid chamber to said control pressure; and said third land covers an exhaust passage containing an exhaust pressure to isolate said exhaust pressure from said second fluid chamber.

10. The pressure regulator apparatus of claim 6, wherein:

fluid pressure supplied to said hydraulic element when said TRIM and ON states are established is obtained from a source of transmission line pressure; and said control pressure is lower than said transmission line pressure.

* * * * *